US00RE35038E

United States Patent [19]

Smith et al.

[11] E Patent Number: Re. 35,038

[45] Reissued Date of Patent: Sep. 19, 1995

[54] PROCESS OF PREPARING FROZEN JUICE PRODUCT

[75] Inventors: Steven Smith; Eric Schafler, both of Great Neck, N.Y.

[73] Assignee: The Fresh Juice Company, Great Neck, N.Y.

[21] Appl. No.: 531,450

[22] Filed: May 30, 1990

Related U.S. Patent Documents

Reissue of:

[64] Patent No.: 4,816,273
Issued: Mar. 28, 1989
Appl. No.: 191,850
Filed: May 3, 1988

U.S. Applications:

[63] Continuation of Ser. No. 863,449, May 15, 1986, abandoned.

[51] Int. Cl.[6] ..... A23L 3/36

[52] U.S. Cl. ..... 426/393; 215/400; 426/115; 426/524

[58] Field of Search ..... 426/111, 115, 393, 524, 426/599; 215/1 C; 62/348, 66

[56] References Cited

U.S. PATENT DOCUMENTS

| | | | |
|---|---|---|---|
| 1,775,549 | 9/1930 | Birdseye | 426/393 |
| 1,980,695 | 11/1934 | Polk | 426/393 |
| 1,990,779 | 2/1935 | Eberts | 426/393 |
| 2,117,215 | 5/1938 | Ruch | 426/393 |
| 3,430,805 | 3/1969 | Buchner et al. | 220/66 |
| 4,197,954 | 4/1980 | Oltman et al. | 215/1 C |

FOREIGN PATENT DOCUMENTS

| | | | |
|---|---|---|---|
| 1326132 | 3/1963 | France | 215/1 C |
| 1074162 | 6/1967 | United Kingdom | 215/1 C |

OTHER PUBLICATIONS

Nagy et al., "Citrus Nutrition and Quality" American Chem. Society Washington, D.C. 1980, pp. 151-156, 225-271.

*Primary Examiner*—Donald E. Czaja
*Assistant Examiner*—Mary S. Mims
*Attorney, Agent, or Firm*—Finnegan, Henderson, Farabow, Garrett & Dunner

[57] ABSTRACT

A process for producing a frozen whole juice product, in which juice is frozen in plastic containers that have substantially planar faces after freezing.

11 Claims, 2 Drawing Sheets

PROCESS OF PREPARING FROZEN JUICE PRODUCT

Matter enclosed in heavy brackets [ ] appears in the original patent but forms no part of this reissue specification; matter printed in italics indicates the additions made by reissue.

*This is an application for reissue of U.S. Pat. No. 4,816,273 issued Mar. 28, 1989 entitled "Process of Preparing Frozen Juice Product".*

This application is a continuation of application Ser. No. 863,449, filed May 15, 1986, now abandoned.

The present invention relates to a process for producing a frozen juice product and the frozen juice product thus obtained. The present invention finds particular utility in the production of frozen orange juice.

Orange juice is commercially available in liquid or frozen concentrate form. While freshly squeezed whole orange juice is available to consumers through restaurants and other points of sale where the orange juice is consumed at the point of sale, distribution of orange juice through conventional retail channels of trade, such as supermarkets, groceries and the like, is substantially restriced to the sale of frozen orange juice concentrate or pasteurized liquid orange juice. However, the orange juice in liquid form is itself often prepared from frozen concentrate, and hence [all] *none of the* orange juice products commercially available through retail channels of trade [do not] capture the true taste of fresh whole orange juice.

The present invention provides a process for producing a frozen whole orange juice product that is packaged in a plastic container having substantially planar faces when juice in the container has been frozen. Accordingly, the frozen whole orange juice products of the present invention can be displayed for sale in the retail store side-by-side without loss of valuable shelf space that would be caused by outward bulging of the filled plastic container sufficient to distort the bottle so that it would lose its square cross section.

In particular, the process of the present invention produces a frozen whole orange juice product as follows.

First, several empty elongated plastic bottles are provided, each having a bottom wall, an elongated side wall and a top wall integrally formed as a single piece from plastic, as by blow-molding. The side wall includes means for controlling the outward bulging thereof upon freezing orange juice in the bottle thereby providing the side wall with substantially planar faces after orange juice in the bottle has been frozen. The bottle also includes an opening in the top wall of the bottle to permit the bottle to be filled and emptied.

The process of the present invention includes precooling fresh whole juice to about 30° F., filling the empty plastic bottles through the openings thereof with the precooled orange juice, closing the openings of each bottle filled with the juice, and rapidly freezing the juice therein to solid form.

The consumer purchases the orange juice product in frozen form and permits the orange juice to defrost in the refrigerator, after which fresh orange juice is available having the taste and nutritional content of freshly squeezed whole orange juice. The orange juice product of the present invention is thus seen to be clearly superior to the juice products conventionally sold in retail channels of trade.

The present invention is illustrated in terms of its preferred embodiment in the accompanying drawings, in which.

Figure 1:
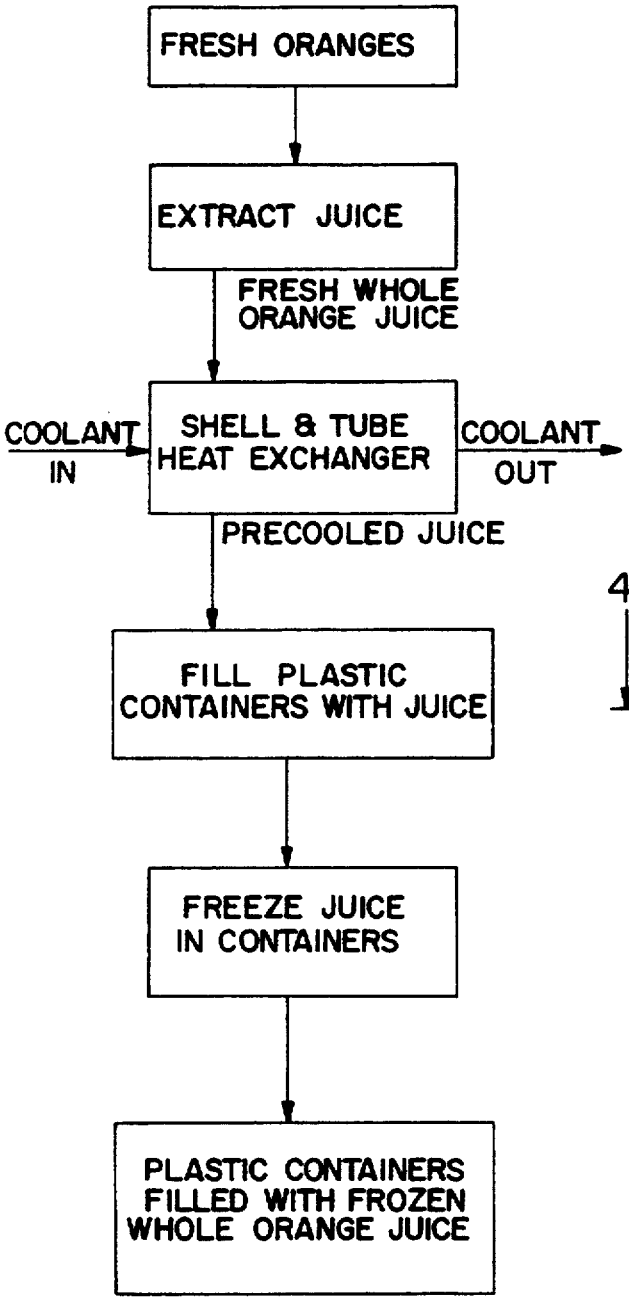
FIG. 1 is a block diagram of the process used in the present invention.

With reference to FIG. 1, the present invention involves extracting juice from fresh oranges to provide fresh whole orange juice. The fresh whole orange juice is then passed through tubes, such as the tubes of a shell and tube heat exchanger, and cooled with a coolant to a temperature above the freezing point. The precooled juice is dispensed into plastic containers to be described in detail hereinafter, which are then exposed to a refrigerant to freeze the juice to solid form. Plastic containers filled with frozen whole orange juice are thus obtained as the product of the present invention.

Figure 2:
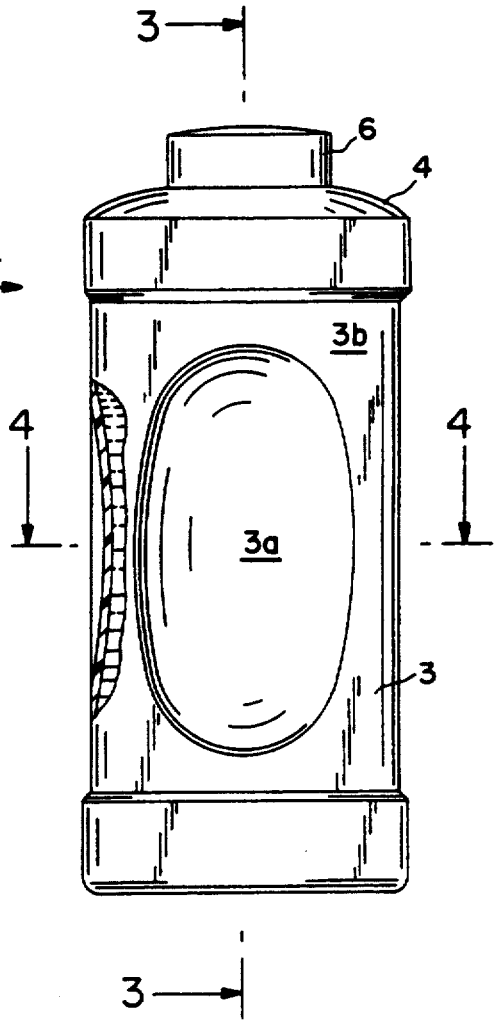
FIG. 2 is an elevational view, partly in section, of the frozen juice product in accordance with the present invention.

FIG. 2 illustrates a plastic container 1 used in the process of the present invention. The bottle 1 has a bottom wall 2, a side wall 3 and a top wall 4 formed as a single piece from a plastic material by any conventional means, such as blow-molding. The top wall 4 is provided with an open neck 5 (FIG. 3), which is closed by the closure 6. Closure 6 is fastened to bottle 1 by any suitable means, such as screw threading (not shown).

Side wall 3 has a substantially square cross-section when the bottle is empty taken perpendicular to the longitudinal axis A (FIG. 3) of bottle 1. Side wall 3 thus provides four substantially planar faces 3b, each provided with a concave area 3a that bulges inwardly of the bottle 1.

Figure 3:
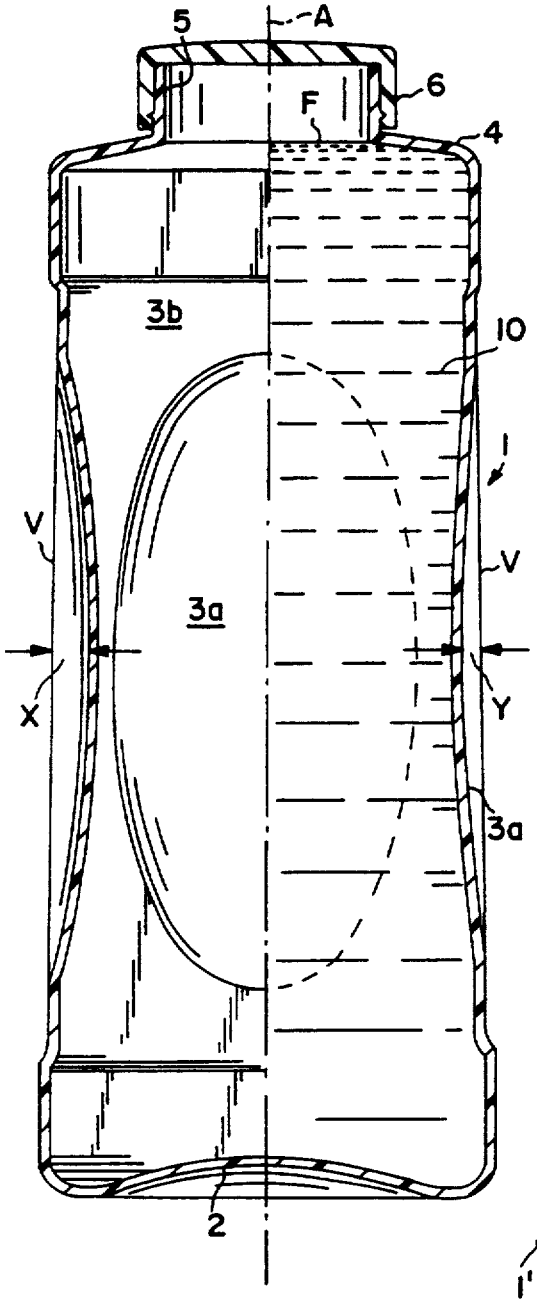
FIG. 3 is a view, in section, taken along lines 3—3 in FIG. 2.

FIG. 3 shows the bottle 1 both empty and filled. Thus, the portion of bottle 1 to the left axis A as viewed in FIG. 3 shows the empty bottle 1, whereas the portion of FIG. 3 to the right of axis A shows the bottle 1 filled with frozen orange juice 10. For purposes of illustration, the inwardly bulged areas 3a are drawn with an exaggerated degree of bulging. As formed, bottle 1 is molded such that the center of each inwardly bulging area is displaced from the vertical plane V of the planar face 3b by a distance x such that the four inwardly bulged areas 3a are effective to limit the outward bulging of the side wall 3 upon the freezing of the juice 10 during the rapid freezing step of the process of the present invention. As seen in the right-hand side of FIG. 3, after the freezing step, the frozen juice 10 expands and causes the inwardly bulging area 3a to be displaced from its original position such that it is now only a smaller distance y from the vertical plane V of planar face 3b. Ideally, the dimension y will be substantially zero, but in practice y may be up to about 1/16 inch to the left or right of the plane V as viewed in FIG. 3. To accomplish this, the center of the concave inwardly bulged areas 3a will be provided with a dimension x in the range of from about $\frac{1}{8}$ to about 3/16 inches for a wall thickness of the side wall 3 from about 0.015 to about 0.018 inches. It is presently preferred to make bottle 1 of a size sufficient to contain one liter of frozen whole orange juice, and this can be readily provided with a bottle that is approximately 8 to 9 inches high with a cross section taken along the longitudinal axis of the bottle of approximately three to three and three-quarter inches square.

It is important to provide sufficient empty space above the precooled orange juice to accommodate expansion of the juice upon freezing thereof. It is presently preferred that the fill line of the precooled juice will be below the top wall 4 so that the juice when frozen will be at position F (FIG. 3), namely at the intersection of the neck 5 and top wall 4, or slightly below position F. For the one liter bottle described above, the fill line of the precooled juice is desirably about $\frac{3}{8}$ to about $\frac{5}{8}$ inch below position F.

The process of the present invention is operated as follows. Whole orange juice is extracted from fresh oranges by any conventional means and the fresh whole orange juice is cooled by passing it by gravity feed through vertical tubes of approximately $\frac{3}{4}$ inches in diameter and 20 feet in length while exposed to ammonia at a temperature from about −20° to about −30° F. to obtain orange juice at about 30° F. Orange juice freezes at about 27° F. and it is usually suitable to precool the juice to within about 5° F. of its freezing point. Bottles 1 are then filled with the precooled juice using any conventional liquid-filling apparatus (not shown). Bottles 1 filled with the juice are closed with closure 6 and are exposed to a refrigerant at a suitable temperature, such as from about −30° to about 0° F., to freeze the juice to a solid form. While it is presently preferred to freeze the juice using air at 0° F. to obtain frozen juice in about 24 hours, other freezing techniques may be employed, such as the quick freezing techniques used for freezing shrimp, ice cream and other foods, which employ cryogenic refrigerants. In such known techniques, the food to be frozen is conveyed through a tunnel while exposed to a cryogenic refrigerant.

The bottles 1 filled with frozen whole orange juice are then obtained as the product of the present invention. Bottles 1 may be formed from any suitable plastic material, such as food grade, high density polyethylene.

Figure 4:
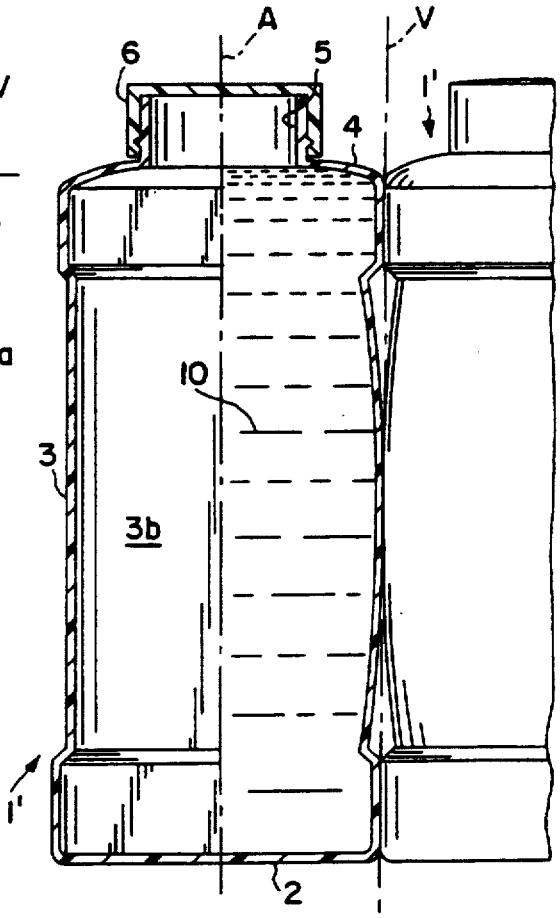
FIG. 4 is a diagrammatic view, in section, similar to FIG. 2 of an alternative embodiment of the present invention.

FIG. 4 illustrates an alternative embodiment of the invention, in which the bottle 1' is identical to the bottle 1 except that the side wall 3 has four planar faces 3b but without the concave inwardly bulged areas 3a. The bottle 1' is shown empty in the left-hand side of [FIG. 5] *FIG. 4* and filled with juice 10 in the right-hand side. The side wall 3 of bottle 1' is sufficiently rigid to resist significant distortion due to the expansion of juice 10 upon freezing. Any distortions that does occur will be limited by the rigid side wall 3 to maintain the substantially square cross section of bottle 1' taken along longitudinal axis A. As in FIG. 3, the distortion of the side wall 3 after the juice 10 has been frozen has been exaggerated for purposes of illustration, and it can be seen that bottle 1' can be stacked side-by-side with another bottle 1', as illustrated by the portion of the bottle adjacent to the right-hand side of bottle 1' shown in section. Sufficient rigidity for side wall 3 can be accomplished by increasing the wall thickness of the side wall 3 to a wall thickness in the range of from about 0.015 to about 3/16 inches for a one-liter bottle.

It is seen that the present invention provides for a frozen whole orange juice product that is commercially feasible to manufacture and sell through conventional retail channels of trade and thus the advantages of fresh orange juice, both in terms of taste and nutrition, can be provided to the consumers. In order to insure the quality of the frozen juice product according to the present invention, it is preferred that the fresh whole orange juice is subjected to the pre-cooling step as promptly as possible, and generally this will be performed within about one minute after the orange juice is extracted from the fresh oranges.

While the present invention has been described in terms of its preferred embodiment, it is to be understood that the present invention embraces any fruit juice product, such as grapefruit juice, apple juice and the like.

We claim:

1. A process for producing from fresh whole citrus fruit juice a frozen whole fruit juice product which upon defrosting has the taste and nutritional content of freshly squeezed whole citrus juice, comprising the steps of:

(a) promptly after extraction, pre-cooling freshly extracted whole citrus fruit juice to a temperature within about 5° F. above the temperature at which the juice freezes;

(b) filling with the pre-cooled fresh whole fruit juice a self-supporting bottle-like container of rectangular cross-section having integrally formed generally planar vertical sidewalls of rectangular shape, a bottom wall and a top wall having a filling and serving opening therein adapted to be sealed with closure means, said sidewalls each being formed to have a concave inwardly bulging area which in response to freezing expansion of the contained juice becomes substantially planar;

(c) sealing the opening in the top wall of the container with a suitable closure means; and (d) promptly after sealing, freezing the contained pre-cooled whole fruit juice, whereby the inwardly bulging area of each sidewall is displaced outwardly in response to freezing and cause the sidewalls to become substantially planar, thereby to form a completely protected solid block of frozen whole fruit juice.

2. A process as defined in claim 1, wherein the citrus fruit juice is freshly extracted orange juice or grapefruit juice.

3. A process as defined in claim 1, wherein the opening in the top wall of said container is sealed with reuseable closure means adapted to be removed to dispense one or more servings of the juice and to reseal the container between servings to facilitate shaking of the remaining juice.

4. A process as defined in claim 3, wherein said opening is circular and surrounded with a threaded neck and said closure means is a threaded cap threadably engaging the threaded neck.

5. A process as defined in claim 1, wherein the sidewalls of said container each has a concave, inwardly bulging area when the container is empty constructed and arranged to assume a position substantially co-planar with the sidewall when forced outwardly by freezing expansion of the contained juice.

6. A method for packaging freshly extracted whole orange juice which enables the juice to be stored for long periods of time without losing the taste and nutritional content of fresh whole orange juice, comprising the steps of:

(a) promptly after extraction, pre-cooling freshly extracted whole orange juice to a temperature about 5° F. above the temperature at which whole orange juice freezes;

(b) filling to a predetermined level with the pre-cooled whole orange juice, a self-supporting bottle-like plastic container of square cross-section having integrally formed generally planar vertical sidewalls of rectangular shape, a bottom wall and a top wall having a filling and serving opening therein adapted to be sealed with resealable closure means, each sidewall being shaped to have a concave area bulging inwardly from the otherwise generally planar sidewall when the container is empty and dimensioned and constructed to be forced outwardly by freezing expansion of the contained juice so as to be substantially co-planar with the sidewall;

(c) sealing the opening in said container with resealable closure means; and (d) promptly freezing the contained pre-cooled juice whereby the inwardly bulging area of each sidewall is displaced outwardly in response to freezing and cause the sidewalls to become substantially planar thereby to form a completely protected solid block of frozen whole orange juice.

7. A method of packaging fresh, whole orange juice as defined in claim 6, wherein said container is made from food grade, high density polyethylene, and wherein said opening is circular and surrounded with a threaded neck and said resealable closure means is a screw cap threadably engaging the threaded neck.

*8. A process for producing from fresh whole fruit juice a frozen whole fruit juice product, comprising the steps of:*

*promptly after extraction, pre-cooling fresh whole fruit juice to a temperature within about 5° F. above the temperature at which the juice freezes;*

*filling with the pre-cooled fresh whole fruit juice a self-supporting bottle-like container of substantially rectangular cross-section having a top wall with an opening therein and having sidewalls, a portion of which sidewalls are inwardly bulging;*

*sealing the opening in the top wall of the container with a closure; and*

*promptly after sealing, freezing the sealed whole fruit juice to produce the frozen whole fruit juice product, wherein the sidewalls bulge outwardly but maintain a substantially rectangular cross-section for storage of multiple filled and frozen containers proximate each other without undue waste of space.*

*9. The method, as claimed in claim 8, wherein the step of sealing the opening is performed with a resealable closure adapted to be removed to dispense the juice and to be resealed to seal any remaining juice in the container.*

*10. The method, as claimed in claim 9, wherein the step of filling fills a container having an opening which is circular and surrounded by a threaded neck, and wherein the step of sealing comprises the step of engaging a threaded cap with the threaded neck.*

*11. The method, as claimed in claim 10, wherein the step of filling fills a container made from polyethylene.*

* * * * *